United States Patent [19]

Aramaki et al.

[11] Patent Number: 5,309,364
[45] Date of Patent: May 3, 1994

[54] TRACE CONTROL METHOD

[75] Inventors: Hitoshi Aramaki; Tetsuji Okamoto, both of Yamanashi, Japan

[73] Assignee: Fanuc Ltd., Minamitsuru, Japan

[21] Appl. No.: 773,942

[22] PCT Filed: Apr. 1, 1991

[86] PCT No.: PCT/JP91/00432
§ 371 Date: Nov. 25, 1991
§ 102(e) Date: Nov. 25, 1991

[87] PCT Pub. No.: WO91/15335
PCT Pub. Date: Oct. 17, 1991

[30] Foreign Application Priority Data

Apr. 2, 1990 [JP] Japan ................... 2-87869

[51] Int. Cl.$^5$ ............................................. G05B 19/36
[52] U.S. Cl. ................. 364/474.03; 318/578; 364/474.370
[58] Field of Search ............ 364/474.03, 474.37; 318/571, 578

[56] References Cited

U.S. PATENT DOCUMENTS 4,703,239 10/1987 Yamazaki et al. ................ 318/578
4,803,633 2/1989 Kishi et al. ................... 364/474.03

FOREIGN PATENT DOCUMENTS 0215128 3/1987 European Pat. Off. .
0226643 7/1987 European Pat. Off. .
0386791 9/1990 European Pat. Off. .

Primary Examiner—Jerry Smith
Assistant Examiner—Steven R. Garland
Attorney, Agent, or Firm—Staas & Halsey

[57] ABSTRACT

In a trace control method used for machining a workpiece by tracing a model with a tracer head, the path and speed of two axes (X- and Y-axes) are controlled by NC commands, but, three axes (X-, Y- and Z-axes) are controlled to carry out the tracing operation. An NC command speed (F) is changed by an override circuit (2b) so that the NC command speed coincides with the composite speed of the three axes controlled to carry out the tracing operation, and the resultant speed (Fd) is supplied to an interpolator (2a). The direction of movement along the X- and Y-axes is controlled by the NC command and the speed is affected by the tracing operation. Thus the trace control method can control movement as though all three axes are controlled by NC commands.

5 Claims, 2 Drawing Sheets

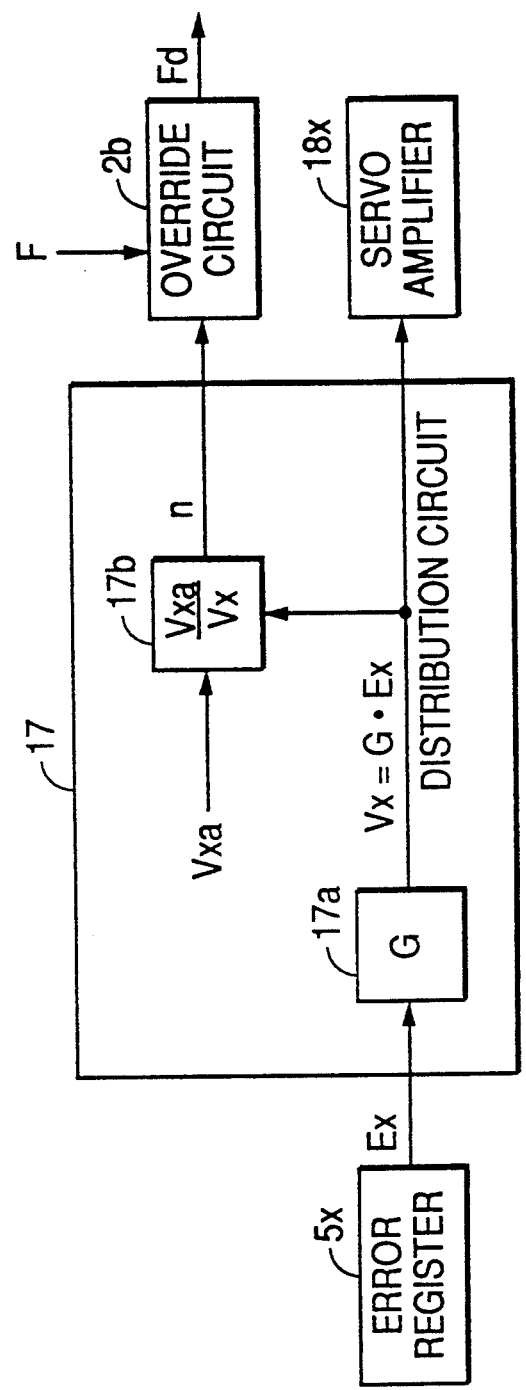

TRACE CONTROL METHOD

BACKGROUND OF THE INVENTION

1. Field of the Invention

The present invention relates to a trace control method for use when machining a metal mold or the like, and more specifically, to a trace control method by which some axes are controlled by an NC command.

2. Description of the Related Art

A control method is used for moving two axes by a numerical control (NC) command and controlling the remaining one axis to carry out a tracing. In this method, for example, the X- and Y-axes are controlled by an NC command and a Z-axis is controlled to carry out a tracing operation. More specifically, the X- and Y-axes are controlled by the NC command and the Z-axis is controlled by the following expression.

$$Vz = (\epsilon - \epsilon_0) \times G$$

where, Vz is a tracing speed of the Z-axis, $\epsilon$ is a composite amount of displacement of the X-, Y- and Z-axes, and $\epsilon_0$ is a standard amount of displacement.

The above trace control method enables any point or path on an X-Y plane to be traced, and thus is very convenient for partially tracing a complex configuration or the like.

Nevertheless, the above method has a low accuracy and the tracing speed cannot be increased because the tracing is carried out for only one axis, and the indexing and distribution are not carried out for the three axes.

In particular, since the indexing and distribution are not carried out, when a tracer head traces an upward plane in the direction in which the tracer head is moving, the head tends to bite into the surface of the model. Conversely, when the tracer head traces a downward plane, the head tends to move away therefrom. As a result, a problem arises in that, when the tracer head is moved forward and then backward, a step is produced at the position at which the upward tracing movement is changed to a downward tracing movement.

SUMMARY OF THE INVENTION

Taking the above into consideration, an object of the present invention is to provide a trace control method by which two axes are controlled by an NC command and three axes are controlled to carry out the tracing.

To attain the above object, according to the present invention, there is provided a trace control method for use when machining a workpiece by tracing a model with a tracer head, comprising the steps of controlling the speed and path of two axes by an NC command, controlling three axes, including these two axes, to carry out a tracing, and controlling the NC command speed to cause the NC command speed to coincide with the composite speed of the three axes controlled to carry out the tracing.

The path and speed of two axes (e.g., X- and Y-axes) are controlled by the NC command, and further, three axes are controlled to carry out the tracing, and the NC command speed is changed such that it coincides with the composite speed of the three axes controlled to carry out the tracing. The paths of the two axes are controlled by the NC command, and the speed thereof is a trace control speed, and thus the trace control method provides a movement equivalent to the movement provided when the three axes are controlled to carry out the tracing.

BRIEF DESCRIPTION OF THE DRAWINGS

FIG. 2 is a block diagram explaining the calculation of a distributed speed.

DESCRIPTION OF THE PREFERRED EMBODIMENT

Figure 1:
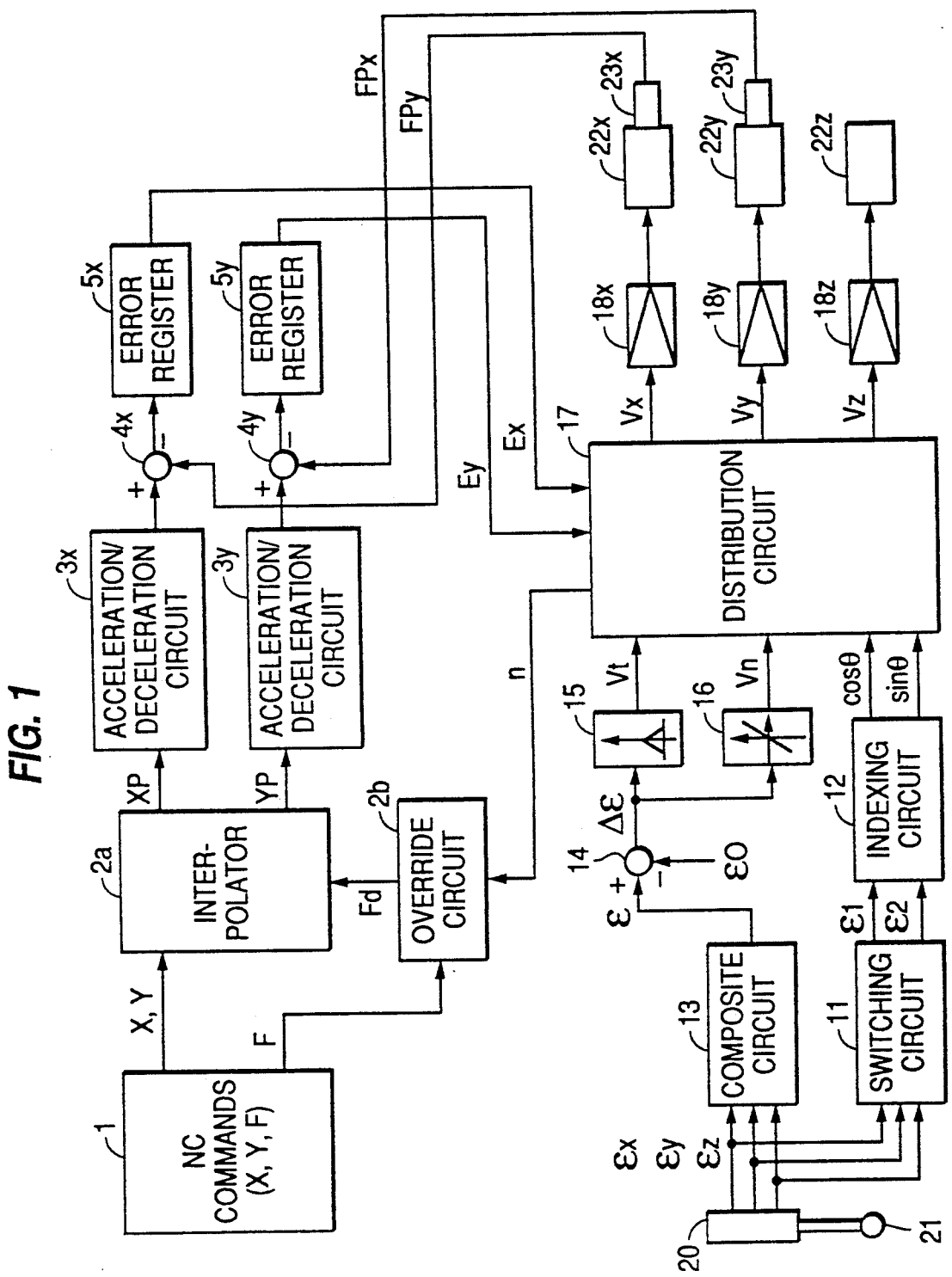
FIG. 1 is a block diagram of a trace control apparatus embodying a trace control method according to the present invention.

An embodiment of the present invention will be described below with reference to the drawings.

FIG. 1 is a block diagram of a trace control apparatus embodying a trace control method according to the present invention. NC commands 1 include a movement command for moving X- and Y-axes on an X-Y plane, and a feed speed command F. The movement command is pulse distributed by an interpolator 2a, based on a speed Fd from an override circuit 2b, which speed will be described below. The speed command F is supplied to the override circuit 2b.

Distributed pulses XP and YP are supplied to acceleration/deceleration circuits 3x and 3y, respectively, are accelerated or decelerated thereby, and then are supplied to adders 4x and 4y. The adders 4x and 4y subtract position feedback pulses FPx and FPy supplied from pulsecoders 23x and 23y, to be described later, from the distributed pulses XP and YP, and the resulting values are supplied to error registers 5x and 5y. Outputs Ex and Ey from the error registers 5x and 5y are supplied to a distribution circuit 17.

The distribution circuit 17 multiplies the errors Ex and Ey by a gain G to create respective speed commands Vx and Vy and then causes servo amplifiers 18x and 18y to drive an X-axis servo motor 23x and a Y-axis servo motor 22y. The pulsecoders 23x and 23y are connected to the X-axis servo motor 22x and Y-axis servo motor 22y, respectively, to feed back the feedback pulses FPx and FPy to the adders 4x and 4y.

Further, a tracer head 20 equipped with a tracing machine tool detects amounts of displacement $\epsilon x$, $\epsilon y$ and $\epsilon z$ in the X-, Y- and Z-axes directions, which are produced when the stylus 21 at the extreme end of the tracer head 20 comes into contact with a model and supplies same to a switching circuit 11 and composite circuit 13. The switching circuit 11 determines an NC command direction, and amounts of displacement $\epsilon 1$ and $\epsilon 2$ in a direction perpendicular to the NC command direction from these amounts of displacement, and supplies same to an indexing circuit 12. The indexing circuit 12 calculates the following equations using the amounts of displacement $\epsilon 1$ and $\epsilon 2$, to determine indexing signals Ec and Es.

$$Ec = \epsilon 1/(\epsilon 1^2 + \epsilon 2^2)^{\frac{1}{2}} = \cos \theta$$

$$Es = \epsilon 2/(\epsilon 1^2 + \epsilon 2^2)^{\frac{1}{2}} = \sin \theta$$

Further, the composite circuit 13 determines a composite amount of displacement $\epsilon[\epsilon = (\epsilon x^2 + \epsilon y^2 + \epsilon z^2)^{\frac{1}{2}}]$ from displacement $\epsilon x$, $\epsilon y$, $\epsilon z$ and supplies same to an arithmetic unit 14, and the arithmetic unit 14 calculates a difference $\Delta \epsilon (\Delta \epsilon = \epsilon - \epsilon_0)$ between the composite amount of displacement $\epsilon$ and a preset reference amount $\epsilon_0$, and supplies same to speed signal generation circuits 15 and 16. The speed signal generation circuit 15 generates a speed signal (tangential direction speed signal) Vt normal to the direction in which the stylus is displaced, based on the difference $\Delta\epsilon$, and further, the speed signal generation circuit 16 generates a feed speed signal (normal direction speed signal) Vn proportional to the difference $\Delta\epsilon$ in the direction in which the stylus is displaced.

The distribution circuit 17 calculates the following expressions using the indexing signals Ec and Es, tangential direction speed signal Vt and normal direction speed signal Vn, to thereby determine the speed components V1 and V2 of two axes on a tracing plane, and produces the speed signals Vxa, Vya and Vz of the X-, Y- and Z-axes from these speed components V1 and V2.

$$V1 = Vt \times \sin\theta - Vn \times \cos\theta$$

$$V2 = -Vt \times \cos\theta - Vn \times \sin\theta$$

The speed command of the Z-axis is supplied to a servo amplifier 18z as is, to drive a Z-axis servo motor 22z.

The tracing speeds Vxa and Vya of the X- and Y-axes are used to control an NC command speed.

Next, the control of the NC command speed will be described. FIG. 2 is a block diagram explaining the calculation of a distributed speed. For simplification, it is assumed here that only the X-axis is controlled by an NC command and only an X component is used as a tracing speed. First, an error Ex from the error register 5x of the X-axis is supplied to the distribution circuit 17 and multiplied by a gain G (17a), to provide a speed Vx which is supplied to the servo amplifier 18x. Then, an arithmetic circuit 17b determines a ratio n of a tracing speed to a speed Vx obtained by the NC command, which is given by the following expression.

$$n = Vxa/Vx$$

The ratio n is supplied to the override circuit 2b, which determines an actual distribution speed Fd from the command speed F given by the following expression, and carries out a pulse distribution based on the distribution speed Fd.

$$Fd = F/n$$

With this arrangement, the tracing speed of the X-axis, controlled to carry out a tracing, coincides with the speed of the X-axis controlled by the NC command, and thus, the same machining accuracy and tracing speed as used when three axes are controlled to carry out a tracing, can be provided.

In the above description, only the X-axis is controlled by the NC command and a tracing speed component is used only for the X-axis. Therefore, when the X- and Y-axes are controlled by the NC command and the tracing component is applied to the X- and Y-axes, the composite speed and trace speed of the X- and Y-axes must be applied to the above two expressions.

Further, when an abrupt bite or the like occurs, the X- and Y-axes may disregards the NC command and take an action such as causing the head to move away from the model, or the like.

Although in the above description the X- and Y-axes are controlled by an NC command and the Z-axis is controlled to carry out a tracing, this combination of the axes may be changed in accordance with a workpiece to be machined.

As described above, according to the present invention, since two axes are controlled by an NC command, three axes are controlled to carry out the tracing, and the NC command speed is made to coincide with the composite speed of the three axes, the tracing accuracy can be improved and the tracing speed can be increased.

We claim:

1. A trace control method used when machining a workpiece by tracing a model with a tracer head moving along first, second and third axes, comprising the steps of:
   (a) controlling speed and direction of movement along the first and second axes in dependence upon a numerical control command defining a first planar velocity along the first and second axes;
   (b) controlling movement along the first, second and third axes to carry out a tracing operation;
   (c) obtaining from the tracing operation a second planar velocity along the first and second axes; and
   (d) adjusting the numerical control command prior to said controlling in step (a), using a ratio of the second planar velocity to the first planar velocity.

2. A trace control method according to claim 1, wherein said adjusting in step (d) includes, when an amount of bit by the tracer head is abruptly increased, controlling movement along the first and second axes to move the tracer head away from the model at a trace control speed.

3. A trace control method according to claim 1, wherein the first and second axes are an X-axis and a Y-axis, respectively, and the third axis is a Z-axis.

4. A trace control method according to claim 1, used when machining a workpiece by tracing a model with a tracer head moving along first, second and third axes, comprising the steps of:
   (a) controlling speed and direction of movement along the first and second axes in dependence upon a numerical control command, including obtaining an error between actual movement and instructed movement along each of the first and second axes;
   (b) controlling movement along the first, second and third axes to carry out a tracing operation; and
   (c) overriding the numerical control command to cause the speed of movement along the first and second axes to coincide with a composite speed required for the tracing operation, said overriding including obtaining the composite speed by multiplying the error of each the first and second axes by a gain n defined by $$n = \frac{\sqrt{Vxa^2 + Vya^2}}{\sqrt{Vx^2 + Vy^2}}$$

where $V_{xa}$ and $V_{ya}$ are tracing speeds along the first and second axes, respectively, and $V_x$ and $V_y$ are commanded speeds along the first and second axes, respectively.

5. A tracer control unit for controlling movement of a tracer head, comprising:
   planar movement control means for generating at least one planar velocity signal to control movement in a plane defined by first and second axes in dependence upon a numerical control command and actual movement in the plane;
   trace signal processing means for receiving trace signals from the tracer head, for generating a third axis velocity signal to control movement along a third axis perpendicular to the first and second axes and for generating a velocity ratio in dependence upon the at least one planar velocity signal and the trace signals; and overriding means for overriding the numerical control command to cause the speed of movement along the first and second axes to coincide with a composite speed required for tracing, based on the velocity ratio.

* * * * *